Nov. 9, 1954 J. A. MELDGAARD 2,693,934
VALVE HANDLE RETAINER
Filed April 20, 1951 2 Sheets-Sheet 1
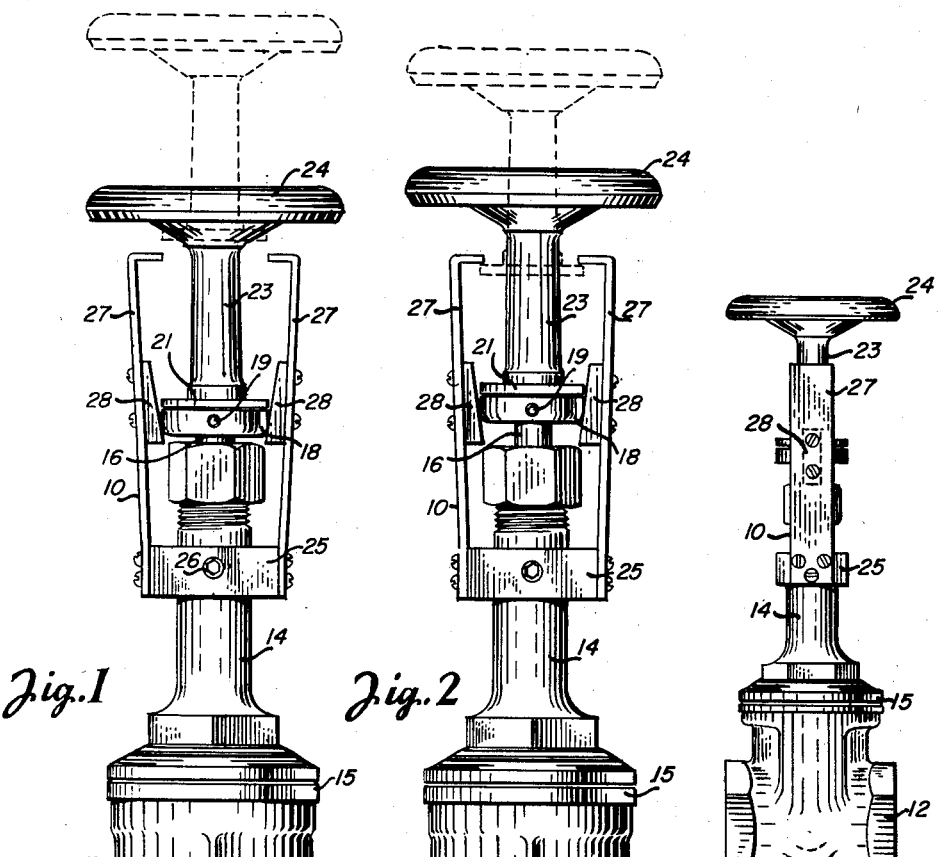
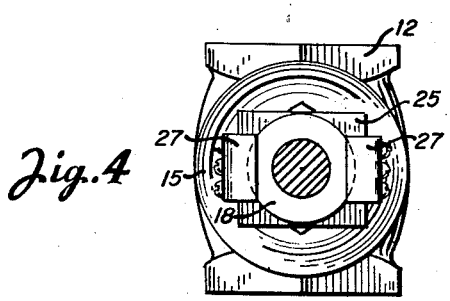
Jerome A. Meldgaard
INVENTOR
Robert J. Leahy
ATTORNEY Nov. 9, 1954     J. A. MELDGAARD     2,693,934
VALVE HANDLE RETAINER Filed April 20, 1951     2 Sheets-Sheet 2

Jerome A. Meldgaard
INVENTOR

ATTORNEY

United States Patent Office 2,693,934
Patented Nov. 9, 1954

2,693,934

VALVE HANDLE RETAINER

Jerome A. Meldgaard, Racine, Wis., assignor to S. C. Johnson & Son, Inc., Racine, Wis.

Application April 20, 1951, Serial No. 221,989

2 Claims. (Cl. 251—291)

This invention relates to a device which insures a complete shut-off of hand-operated valves. More specifically, it relates to a device employed with a plurality of hand-operated valves which insures complete shut-off of one valve before another can be opened.

In numerous devices a plurality of valves are used to regulate the flow of the same charge, and in many instances complete shut-off of one valve should be observed before opening another. For example, in the production processing of many liquid compositions, mixing of ingredients or similar steps in manufacture are conducted in huge vats. Before opening the charge inlet valve, caution should be observed that the discharge valve, or the valve positioned at the lower portion of the vat is completely closed. If this is not observed, obviously much loss of liquid material will result. I have found in the past that even where the attendants are normally cautious and observing people, and even where they have been repeatedly forewarned of the requirements, nevertheless, through inadvertence or forgetfulness, a valve which should be closed prior to opening another is often left open.

An object of the present invention is to provide a device which insures the complete shut-off of a hand-operated valve before allowing the opening of another valve which regulates the flow of the same charge.

A further object of the invention is to provide a device of this character which will be efficient and simple to operate, yet most inexpensive and expedient to install.

Other objects of the present invention will become apparent in the course of the following specification.

In the drawings:

Figure 1 is an end elevational view of the device attached to a closed gate valve, depicting withdrawal of the handle assembly.

Figure 2 is an end elevational view of the device attached to a partially closed gate valve, depicting attempted withdrawal of the handle assembly.

Figure 3 is a side elevational view of the device attached to a gate valve.

Figure 4 is a top plan view with the handwheel removed.

Figures 5, 6:
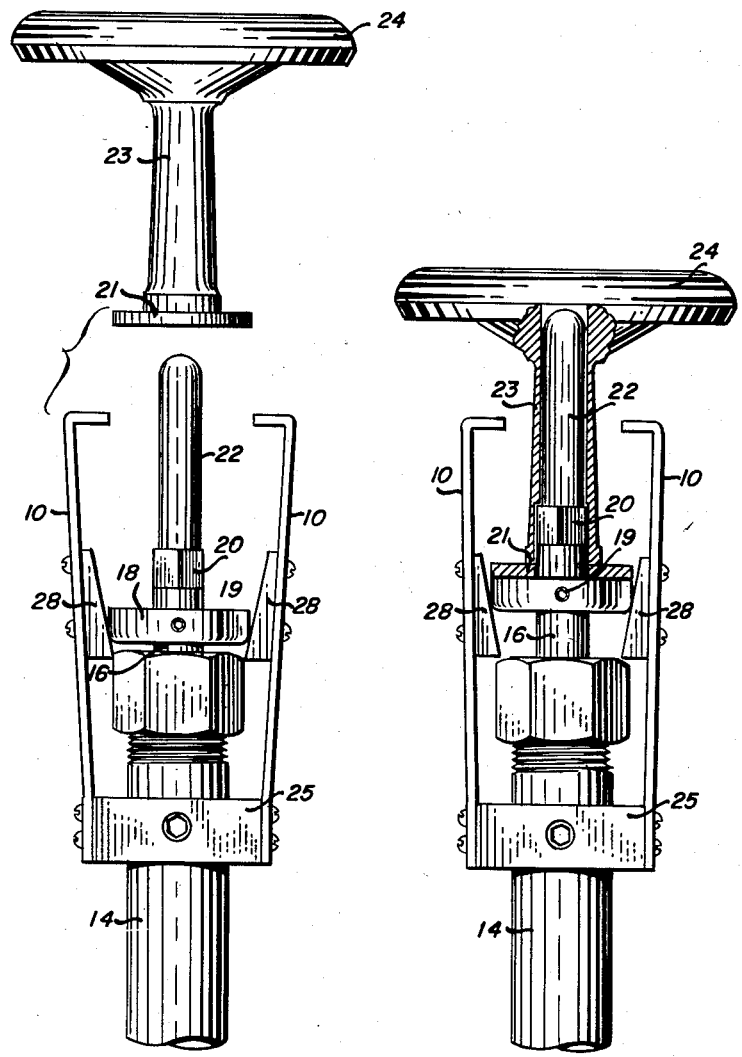
Figure 5 is a detailed view of the assembled device.
Figure 6 is a detailed view of the disassembled device.

Similar numerals refer to the similar parts throughout the several views. Referring especially to Figure 1, it will be seen that the device is generally designated by the numeral 10, attached to an otherwise conventional gate valve 11. Fashioned in the valve body 12 is a charge passageway 13. The bonnet 14 is conventionally secured to the valve body by means of the bonnet ring 15. The valve stem 16 reciprocates through the bonnet 14 and has positioned on one extremity within the valve body 12 a gate disc 17. When the valve stem 16 is turned to the right, it moves deeper into the bonnet 14 causing the gate disc 17 to block the passage of fluid through the passageway 13. At substantially the end of the valve stem 16, opposite to that to which the gate disc 17 is connected, a stationary collar 18 is affixed, as, for example, by means of a drop screw 19. Extending but a short distance through the stationary collar 18, the valve stem 16 is no longer tubular-shaped, but the fashioned portion 20 is square-shaped. The valve stem 16 then resumes its former shape as shown in the extended portion 22. Fitting over the fashioned portion 20 is a retaining collar 21, being recessed in its center in a manner to conform to the shape of the fashioned portion 20. A spindle or sleeve 23 extends from the retaining collar 21 over the extended portion 22 of the stem and has affixed at its end a handwheel 24.

The device is workably secured to the bonnet 14 by means of a yoke 25 provided for this purpose. The yoke may be permanently affixed to the bonnet or movably attached as, for example, by means of set screw 26. The yoke carries arms 27 which extend longitudinally away from the valve body 12 and in a plane substantially parallel to the valve stem 16. Each of the arms 27, at a point near its free extremity, is bent in converging relationship, forming an angle of substantially 90°, so that when the valve is even partially opened, the extended portion 22 of the valve stem 16 protrudes at least as far as, or slightly beyond, the free ends of the arms 27. Positioned on the inner surface of the arms 27, that is, the surface facing the valve stem 16, are bevelled expanders 28.

In operation, let us assume that the conventional gate valve assembly with the device attached is used as the discharge valve, regulating the outlet of material at the bottom of a huge mixing vat. Above this mixing vat is a charge inlet valve and obviously the discharge valve should be entirely closed before the inlet valve is opened. In order to insure this, it is necessary that the handwheel 24 be turned to the right until the gate disc 17 completely blocks the passageway in the valve body 12. As the handwheel 24 is turned to the right, it turns the valve stem 16 by virtue of the cooperating interfacial configuration of the fashioned portion 20 and the retaining collar 21. This causes the valve stem to move deeper into the valve body carrying with it the stationary collar 18. The stationary collar moves between the bevelled expanders 28 causing expansion of the arms 27. When the gate disc 17 has completely blocked the passageway, the stationary collar 18 will have caused the arms 27 to have been expanded to such a degree that the retaining collar 21 may be slipped off the fashioned portion 20 and the distance between the free ends of the arms 27 will now be great enough to allow the retaining collar to be removed therebetween. Thereupon, the handle assembly consisting of the retaining collar 21, the sleeve 23 and the handwheel 24 may be removed and slipped onto the extended portion of the valve stem of the inlet valve and used to open this valve.

Should an attempt be made to remove the handle assembly before the gate disc 17 has completely blocked the discharge passageway, the turning of the handwheel will not have moved the stationary collar 18 a sufficient distance between the bevelled expanders 28 and the arms therefore will not have been expanded sufficiently to allow removal of the handle assembly.

Only one handle assembly should be provided for each pair of valves, that is, for each pair of inlet and discharge valves or each plurality of cooperating valves. If found expedient, as, for example, where several pairs of valves are being employed in a series of vats and one handle assembly is provided for each pair, the retaining collar 21 and the stationary collar 18 may be fashioned to interfacially lock in a manner unique to the other pairs of valves. This can be obviously accomplished by providing for a protruding pin in one of the collars and a recess in the other. This would disallow the using of the handle assembly with any set of valves other than the pair for which it was intended.

It will be appreciated that the utility of the device is not unique alone in its cooperation with gate valves, but may be used with cutoff valves, check valves, or any valve whose operation is hand-motivated. It should be appreciated that the arms 27 may be constructed of metal strips practically without restriction as to number, but must be of such resilience that they shall readily expand and resume their original or normal position.

Thus, in accordance with my invention, I have provided a device which insures the complete shut-off of a hand-operated valve. In addition, where the same handle assembly is utilized by two or more valves, I have provided a device which insures the complete shut-off of one valve before another can be opened.

I wish it understood that I do not desire to be limited to the exact details of construction shown and described, for obvious modifications will occur to a person skilled in the art.

I claim:

1. In combination with a hand-operated valve having a valve stem mounted for reciprocation with the valve opening and closing movement, and a handle assembly removably mounted on and keyed to said valve stem, a device of the character described to insure complete closure of said valve before removal of the handle assembly, comprising a yoke attached to said valve, resilient arms extending from said yoke substantially parallel to the valve stem, said resilient arms having their free ends turned radially inwardly in opposed relationship and spaced to define an opening therebetween, retaining means on said handle assembly adapted to engage said inwardly turned ends to prevent withdrawal of said handle assembly, and expanding means affixed to said valve stem and to said resilient arms adapted to cooperate to progressively expand the resilient arms and thereby enlarge the opening defined by said inwardly-turned ends upon movement of the stem to a full valve-closed position, whereby upon such movement, the opening defined by said inwardly-turned ends is so enlarged as to permit the withdrawal of said retaining means therethrough.

2. The device of claim 1 wherein the expanding means affixed to the valve stem comprises a collar, the expanding means cooperating with said collar being a bevelled block affixed to the inner surface of each of the resilient arms with the bevel converging inwardly from the free end of each of said arms.

References Cited in the file of this patent

UNITED STATES PATENTS

| Number | Name | Date |
|---|---|---|
| 623,331 | McOskey | Apr. 18, 1899 |
| 624,628 | Corey | May 9, 1899 |
| 1,477,419 | Bertram | Dec. 11, 1923 |